US009357022B1

(12) United States Patent
Chou et al.

(10) Patent No.: US 9,357,022 B1
(45) Date of Patent: May 31, 2016

(54) MEASURING EFFECTIVENESS OF SOCIAL NETWORKING ACTIVITY

(71) Applicant: Google Inc., Mountain View, CA (US)

(72) Inventors: Linus Page Chou, San Francisco, CA (US); Jacob Burton Matthews, Chicago, IL (US); Paul Baker, Chicago, IL (US); Jonathan Klem, Oak Park, IL (US); Jige Yu, Northbrook, IL (US); James Hyunsoo Koh, Chicago, IL (US); Maciej Henryk Babinski, Chicago, IL (US)

(73) Assignee: Google Inc., Mountain View, CA (US)

( * ) Notice: Subject to any disclaimer, the term of this patent is extended or adjusted under 35 U.S.C. 154(b) by 373 days.

(21) Appl. No.: 13/916,502

(22) Filed: Jun. 12, 2013

Related U.S. Application Data

(60) Provisional application No. 61/665,858, filed on Jun. 28, 2012.

(51) Int. Cl.
*G06F 15/16* (2006.01)
*H04L 29/08* (2006.01)

(52) U.S. Cl.
CPC .................................... *H04L 67/22* (2013.01)

(58) Field of Classification Search
CPC ... G06Q 50/01; G06Q 30/02; G06Q 30/0251; G06Q 30/0255; G06Q 30/0269
USPC .................. 709/204, 206, 223, 224; 705/319; 715/751, 753, 758
See application file for complete search history.

(56) References Cited

U.S. PATENT DOCUMENTS

| 7,886,000 | B1* | 2/2011 | Polis et al. | 709/203 |
|---|---|---|---|---|
| 7,949,643 | B2 | 5/2011 | Kawale et al. | |
| 7,958,127 | B2 | 6/2011 | Edmonds et al. | |
| 7,979,300 | B2 | 7/2011 | Chandra | |
| 8,312,056 | B1* | 11/2012 | Peng et al. | 707/802 |
| 8,606,792 | B1* | 12/2013 | Jackson et al. | 707/748 |

(Continued)

OTHER PUBLICATIONS

Chai, et al., "Assessing Post Usage for Measuring the Quality of Forum Posts," Digital Ecosystems and Business Intelligence Institute, Curtin University, Perth AU, Apr. 2010, <http://kevinchai.net/wp-content/uploads/2011/06/assessing-post-usage-for-measuring-the-quality-of-forum-posts.pdf>, 6 pages.

(Continued)

*Primary Examiner* — Oanh Duong
(74) *Attorney, Agent, or Firm* — McDermott Will & Emery LLP

(57) ABSTRACT

A system and machine-implemented method for providing effectiveness indications for social networking activity including receiving a request to provide an effectiveness score, identifying a plurality of actions performed with respect to the social networking activity by one or more other users exposed to the social networking activity, determining the total number of unique users performing the action, calculating an activity score for the social networking activity based on the determined number of users, determining a number of the users exposed to the social networking activity, calculating an effectiveness score for the social networking activity based on the total activity score and the number of users exposed to the social networking activity, wherein the effectiveness score comprises calculating the effectiveness score at least in part based on a ratio of the activity score to the number of the users exposed to the to the social networking activity.

20 Claims, 4 Drawing Sheets

(56) References Cited

U.S. PATENT DOCUMENTS

| | | | |
|---|---|---|---|
| 8,650,210 B1* | 2/2014 | Cheng et al. | 707/770 |
| 8,886,723 B1* | 11/2014 | Gargi et al. | 709/204 |
| 8,938,500 B1* | 1/2015 | Acharya | 709/204 |
| 8,990,340 B1* | 3/2015 | Polis et al. | 709/217 |
| 9,026,592 B1* | 5/2015 | Marra | H04L 29/06414 709/204 |
| 2008/0201348 A1* | 8/2008 | Edmonds et al. | 707/101 |
| 2011/0125550 A1* | 5/2011 | Erhart | G06Q 30/0201 705/7.29 |
| 2012/0066196 A1* | 3/2012 | Dempski et al. | 707/706 |
| 2012/0246243 A1* | 9/2012 | Nagamine | 709/206 |
| 2012/0284251 A1* | 11/2012 | Haas et al. | 707/709 |
| 2012/0296920 A1* | 11/2012 | Sahni | H04L 67/22 707/749 |
| 2013/0036169 A1* | 2/2013 | Quigley et al. | 709/204 |
| 2013/0173333 A1* | 7/2013 | Zhang | G06Q 50/01 705/7.29 |
| 2013/0226711 A1* | 8/2013 | Wu et al. | 705/14.69 |
| 2013/0262216 A1* | 10/2013 | Zhang | G06Q 30/0631 705/14.36 |
| 2013/0311556 A1* | 11/2013 | Srivastava | G06Q 50/01 709/204 |

OTHER PUBLICATIONS

Davis, "5 Essential & Easy Social Media Metrics You Should Be Measuring Right Now," Apr. 2012, <http://blog.kissmetrics.com/essential-social-media-metrics/>, 12 pages.

* cited by examiner

| Post | | 303 | 304 Total post views | 305 Interaction rate |
|---|---|---|---|---|
| 301 | Post 1 | 5:40 PM | 1,134 | 1.32% |
| | Post 2 | 4:27 PM | 24,658 | 2.39% |
| | Post 3 | 2:11 PM | 18,746 | 1.93% |
| | Post 4 | 15:52 PM | 92,079 | 4.29% |
| | Post 5 | 9:23 PM | 34,588 | 5.38% |
| | Post 6 | Yesterday 9:35 PM | 37,576 | 2.91% |
| | Post 7 | Yesterday 11:29 PM | 15,087 | 9.92% |
| | Post 8 | Yesterday 6:42 PM | 87,345 | 1.23% |
| | Post 9 | Oct 29, 2011 | 24,687 | 2.33% |
| | Post 10 | Oct 29, 2011 | 44,444 | 5.25% |
| | | | | 1-10 of 492 < > |

MEASURING EFFECTIVENESS OF SOCIAL NETWORKING ACTIVITY

CROSS-REFERENCE TO RELATED APPLICATION

The present application claims the benefit of U.S. Provisional Patent Application Ser. No. 61/665,858, entitled "Measuring Effectiveness of Social Networking Activity," filed on Jun. 28, 2012, which is hereby incorporated by reference in its entirety for all purposes.

BACKGROUND

As social networking activity becomes more prevalent, and businesses begin to invest in marketing in social media outlets, it is important to facilitate an effective way of understanding the effectiveness of social networking efforts by businesses and/or individuals. As an example, when a business or individual performs some social networking activity (e.g., posting a post, video, promotion, or other similar content), it is useful to provide for a meaningful way to determine the effectiveness of that content among the target audience. One way effectiveness of social networking activity is measured is through determining the reach and engagement levels with respect to the social networking activity. Currently, the effectiveness of a social networking activity among a target audience is measured using a count of explicit actions taken by a user towards the social networking activity (e.g., content posted). These counts include number of comments, shares and/or endorsements (e.g., +1s, likes or other similar action) taken towards the original social networking activity (e.g., content posted).

SUMMARY

The disclosed subject matter relates to a computer-implemented method for providing effectiveness indications for social networking activity, the method comprising receiving a request to provide an effectiveness score associated with a social networking activity by a first user at a profile associated with the first user. The method further comprising identifying a plurality of actions performed with respect to the social networking activity by one or more other users exposed to the social networking activity, wherein the plurality of actions includes explicit actions and implicit actions. The method further comprising for each of the plurality of actions, determining the total number of unique users performing the action. The method further comprising calculating an activity score for the social networking activity based on the determined number of users performing each of the plurality of actions, wherein calculating the activity score comprises calculating the activity score based at least in part on a sum of the number of unique users performing the action for the plurality of actions. The method further comprising determining a number of the users exposed to the social networking activity. The method further comprising calculating an effectiveness score for the social networking activity based on the total activity score and the number of users exposed to the social networking activity, wherein the effectiveness score comprises calculating the effectiveness score at least in part based on a ratio of the activity score to the number of the users exposed to the to the social networking activity and providing the effectiveness score for display in response to the request.

The subject disclosure also relates to a computer-implemented method for providing effectiveness indications for social networking activity, the method comprising identifying a social networking activity by a first user at a profile associated with the first user. The method further comprising identifying a plurality of actions performed with respect to the social networking activity by one or more other users exposed to the social networking activity, wherein the plurality of actions includes explicit actions and implicit actions. The method further comprising, for each of the plurality of actions, determining the total number of unique users performing the action and calculating an activity score for the social networking activity based on the determined number of users performing each of the plurality of actions.

The method may further comprise receiving a request to provide an activity score associated with the social networking activity and providing the activity score for display, in response to the request. Calculating the activity score comprises calculating the activity score based at least in part on a sum of the number of unique users performing the action for the plurality of actions. The method may further comprise determining for each of the plurality of actions, a weight associated with the action and calculating the activity score based on the weight associated with each of the plurality of actions.

The activity score comprises a weighted sum of the total number of unique users performing each of the plurality of actions based on the weight associated with each of the plurality of actions. The method may further comprise determining a number of the users exposed to the social networking activity and calculating an effectiveness score for the social networking activity based on the total activity score and the number of users exposed to the social networking activity.

The method may further comprise receiving a request to provide an effectiveness score associated with the social networking activity and providing the effectiveness score for display in response to the request. Calculating the effectiveness score comprises calculating the effectiveness score at least in part based on a ratio of the activity score to the number of the users exposed to the to the social networking activity.

The social networking activity comprises a post, the post comprising content posted to the profile associated with the first user. The explicit actions comprise actions that are viewable by the first user. The implicit actions comprise actions that are not viewable by a user.

The subject disclosure further relates to a system for providing effectiveness indications for social networking activity, the system comprising one or more processors and a machine-readable medium comprising instructions stored therein, which when executed by the processors, cause the processors to perform operations comprising identifying a social networking activity by a first user, at a profile associated with the first user. The operations further comprising identifying a plurality of actions performed with respect to the social networking activity by one or more other users exposed to the social networking activity, wherein the plurality of actions includes explicit actions and implicit actions. The operations further comprising for each of the plurality of actions, determining the total number of unique users performing the action. The operations further comprising calculating an activity score for the social networking activity based on the determined number of users performing each of the plurality of actions. The operations further comprising determining a number of the users exposed to the social networking activity and calculating an effectiveness score for the social networking activity based on the total activity score and the number of users exposed to the social networking activity.

The operations may further comprise receiving a request to provide an effectiveness score associated with the social networking activity and providing the effectiveness score for display, in response to the request. Calculating the effectiveness score comprises calculating the effectiveness score at least in part based on a ratio of the activity score to the number of the users exposed to the to the social networking activity. The explicit actions comprise actions that are viewable by the first user and wherein the implicit actions comprise actions that are not viewable by a user.

The operations may further comprise determining for each of the plurality of actions, a weight associated with the action and calculating the activity score based on the weight associated with each of the plurality of actions. The activity score comprises a weighted sum of the total number of unique users performing each of the plurality of actions based on the weight associated with each of the plurality of actions.

Calculating the activity score comprises calculating the activity score based at least in part on a sum of the number of unique users performing the action for the plurality of actions. The social networking activity comprises a post, the post comprising content posted to the profile associated with the first user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

FIG. 3 illustrates an example graphical user interface displaying the effectiveness score of one or more posts to an entity owner.

DETAILED DESCRIPTION

Figure 1:
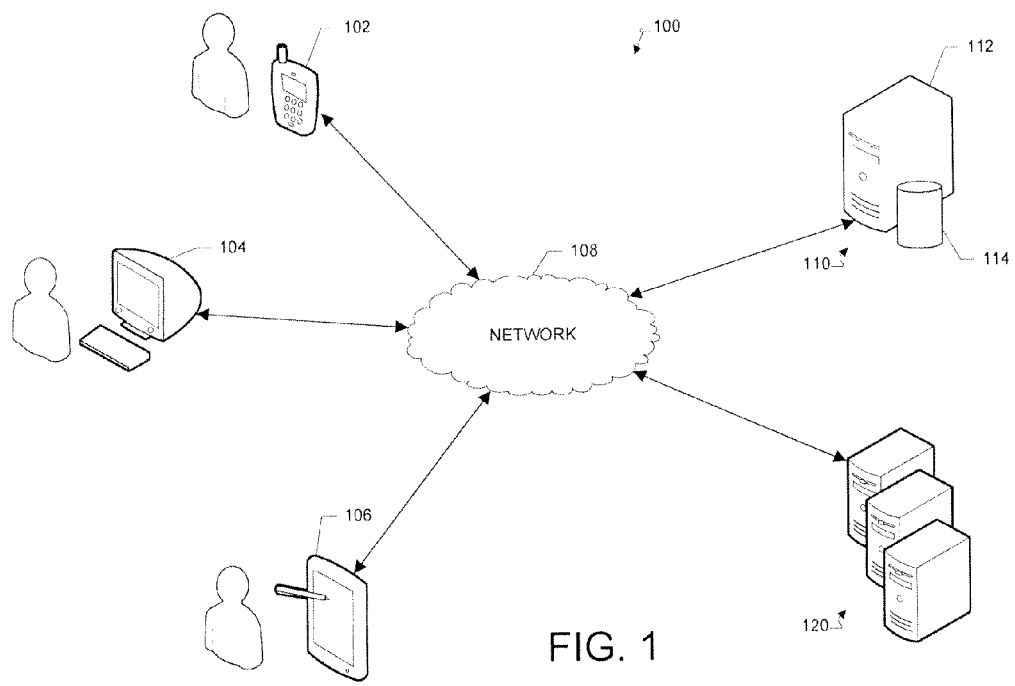
FIG. 1 illustrates an example client-server network environment which provides for measuring effectiveness of social networking activity.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in step diagram form in order to avoid obscuring the concepts of the subject technology.

The subject disclosure provides for measuring effectiveness of a social networking activity (e.g., a content posted), according to both implicit and explicit actions taken by users towards the social networking activity (e.g., post) which provides both an indication of the reach and engagement of users towards the social networking activity. There are two dimensions along which the success of social networking activity may be measured. The first is the overall reach of the social networking activity, which may be expressed as the number of users who were exposed to the social networking activity. A second indication is the engagement that the activity generates. The engagement a social networking activity generates may be a combination of both explicit and implicit activities. The engagement dimension provides an indication of whether, once a user views and/or is exposed to the social networking activity, the user interacts or shows some level of engagement with respect to the social networking activity (e.g., beyond just viewing the social networking activity).

An effectiveness score may be provided as a percentage and represents the percentage of users who after being exposed to the social networking activity (e.g., viewing a post), engaged with it in some manner. Various actions may be considered as engagement including for example, sharing, commenting, endorsements, clicking an embedded link, or expanding a post. Additionally, actions which indicate the post was read such as scrolling, mouse hover, and time in active window can also be considered. The percentage facilitates comparing posts that reach different sets and sizes of users, across different users and accounts and across different social networks or social networking services. Similarly, effectiveness scores may be calculated for a collection of one or more social activities at a profile (e.g., all social activity within a specific period of time, or having a particular characteristic).

Taking as an example posts on a social network ("posts"), an effectiveness score is calculated for each post or a collection of posts, where the effectiveness score indicates the ratio or percentage of actions taken towards a post to the total number of views of the post. The actions taken towards the posts include both explicit actions (e.g., actions typically viewable and detectable by the profile owner), as well as implicit actions (e.g., actions not easily viewable or detectable by a profile owner). For example, explicit actions towards a post may include sharing the post, endorsements (e.g., +1s, likes or similar positive or negative endorsements of a post), and/or comments about the posts, which can be viewed by the user, counted, and reported to the user. Additionally, the effectiveness calculation takes into account implicit actions, which may not be easily viewable or reported to the user, including users choosing to follow a profile associated with a post (e.g., the owner of the post and/or content of the post) after having viewed the post, a user click through to the profile associated with the post, clicking on a link within the posts, hovering over the post, expanding the post, scrolling through all comments associated with the post, starting a comment that is not actually posted, and/or taking other similar actions towards the post.

The number of users taking each of the one or more actions is tallied and the total number of users is associated with each of the actions. The total number of unique users associated with each of the actions are then added together to obtain the activity score, which is at least based in part on the total number of unique actions taken towards the post. In one example, the total number of unique actions may be a weighted total, where one or more actions are associated with a weight to indicate the importance of the action with respect to the effectiveness of the posts. For example, the number of shares of a post is likely to be a better indication of the effectiveness of the post, since typically a share leads to more viewing of the post, whereas an endorsement may not be as indicative of the effectiveness of the post. Thus, a higher weight may be assigned to the number of shares associated with the post, in relation to the number of endorsements associated with that post. In one example, a weight may be assigned to one or more of the actions taken into account when calculating the activity score of the post. The weights may be assigned by the user (e.g., owner of the profile), the system administrator, the social service and/or the system based on characteristics or preferences of the user and/or other considerations regarding the value of each action with respect to the effectiveness of the post.

In addition to the activity score, the system also determines the total number of unique users exposed to the post. The system then calculates the ratio of the actions taken towards the post over the number of people exposed to the post and provides the ratio to the user (e.g., owner of the profile and/or post) as an effectiveness score. In addition to providing an overall indication of the effectiveness of the post, the effectiveness score further provides for comparison of social networking activity on various profiles, which may have different number of followers or audience. That is, unlike reporting the number of shares, comments or endorsements, provided to the user, which do not take into account the actual number of viewers who were exposed to the post or viewed the post, the effectiveness score provides a ratio which is based in part on the total number of users exposed to the post. Accordingly, posts can be compared to one another, and provide a meaningful comparison, regardless of the number of audience associated with different profiles.

The phrase "social networking service" as used herein encompasses its plain and ordinary meaning, including, but not limited to, an online service, platform or site that focuses on building and reflecting of social associations and interactions among users. These associations may be stored within a social graph at each social networking service. Such user associations may be defined on a user-to-user basis, or as a group of users associated through membership within a group. A user of the social networking service, may be associated with one or more profiles, and may further follow (e.g., subscribe to) one or more other profiles owned by one or more other users or entities.

The phrase "profile owner" as used herein, encompasses its plain and ordinary meaning, including, but not limited to, an entity or person associated with one or more social networking profiles or pages and having ownership of the profile or page(s), or being affiliated with the person or entity having ownership of the profile or page(s). The profile owner may refer to one or more users who have access to and may perform social networking activity which is associated with the profile.

FIG. 1 illustrates an example client-server network environment which provides for measuring effectiveness of social networking activity. A network environment 100 includes a number of electronic devices 102, 104 and 106 communicably connected to a server 110 by a network 108. One or more remote servers 120 are further coupled to the server 110 and/or the one or more remote electronic devices 102, 104 and 106. Server 110 includes a processing device 112 and a data store 114. Processing device 112 executes computer instructions stored in data store 114, for example, to assist in reducing load time for displaying a webpage or web application at electronic devices 102, 104 and 106.

In some example embodiments, electronic devices 102, 104 and 106 can be computing devices such as laptop or desktop computers, smartphones, PDAs, portable media players, tablet computers, televisions or other displays with one or more processors coupled thereto and/or embedded therein, or other appropriate computing devices that can be used to for displaying a web page or web application. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other embodiments, server 110 can represent more than one computing device working together to perform the actions of a server computer (e.g., cloud computing). The server 110 may host the web server communicationally coupled to the browser at the client device (e.g., electronic devices 102, 104 or 106) via network 108. In one example, the server 110 may host the system and/or the local service.

Each of the one or more remote servers 120 can be a single computing device such as a computer server or can represent more than one computing device working together to perform the actions of a server computer (e.g., cloud computing). Each of the one or more remote servers 120 may host one or more social networking services including a profile of a user and/or may host one or more applications for maintaining analytics information regarding social networking activity by the profile owner and/or other users with respect to the social networking profile of a profile owner at one or more social networking services.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

A profile owner interacting with a client device (e.g., electronic devices 102, 104 or 106) may have one or more profiles at one or more social networking services (e.g., hosted by a remote server 120). The profile owner may perform one or more social networking activities with respect to the profile, including for example posting content (e.g., a post) to the profile for viewing by one or more other users of the social networking service (e.g., one or more users subscribed to the profile of the profile owner or otherwise being exposed to the social activity of the profile owner). The system at the server 110 and/or one or more servers 120 may maintain information regarding the interaction of one or more other users of the social networking service with respect to the social networking activities associated with the profile. The system may, calculate an effectiveness score for one or more social activities according to the interaction of other users of the social networking service with the one or more social networking activities.

The system (e.g., hosted by server 110) calculates a metric providing an indication of the effectiveness of social networking activity performed, according to both implicit and explicit actions taken by users towards the social networking activity (e.g., post) which provide both an indication of the reach and engagement of users towards the post. There are two dimensions along which the success of social networking activity may be measured. The first is the overall reach of the social networking activity, which may be expressed as the number of users who viewed a post. A second indication is the engagement that the activity generates. The engagement a social networking activity generates may be a combination of both explicit and implicit activities. The engagement dimension provides an indication of whether, after being exposed to or viewing a post, the user then interacted or showed some level of engagement with respect to the post, beyond just viewing the post.

An effectiveness score is provided as a percentage and represents the percentage of users who after viewing the post, engaged with it in some manner. Various actions may be considered as engagement including for example, sharing, commenting, endorsements, clicking an embedded link, or expanding a post. Additionally, actions which indicate the post was read such as scrolling, mouse hover, time in active window can also be considered. The percentage facilitates comparing posts that reach different sets and sizes of users, across different users and accounts and across different social networks or social networking services.

In one example, the system first identifies a social networking activity (e.g., a post). The system next determines both implicit and explicit actions taken towards the social networking activity. The system generates an activity score by aggregating the number of unique users which performed an action with respect to the post. The activity score may be calculated such that each unique action performed by a user with respect to the post increments the sum (e.g., each unique action increments the total count by one, even if performed by the same user), or may reflect the number of unique users which performed an action towards the post (e.g., if the user performs more than one type of action, the count is only incremented by one). The system further determines the total number of unique users exposed to the post (e.g., users that viewed the post). Based on the calculated action score and the total number of unique users that viewed the post, the system calculates an effectiveness score for the post.

Figure 2:
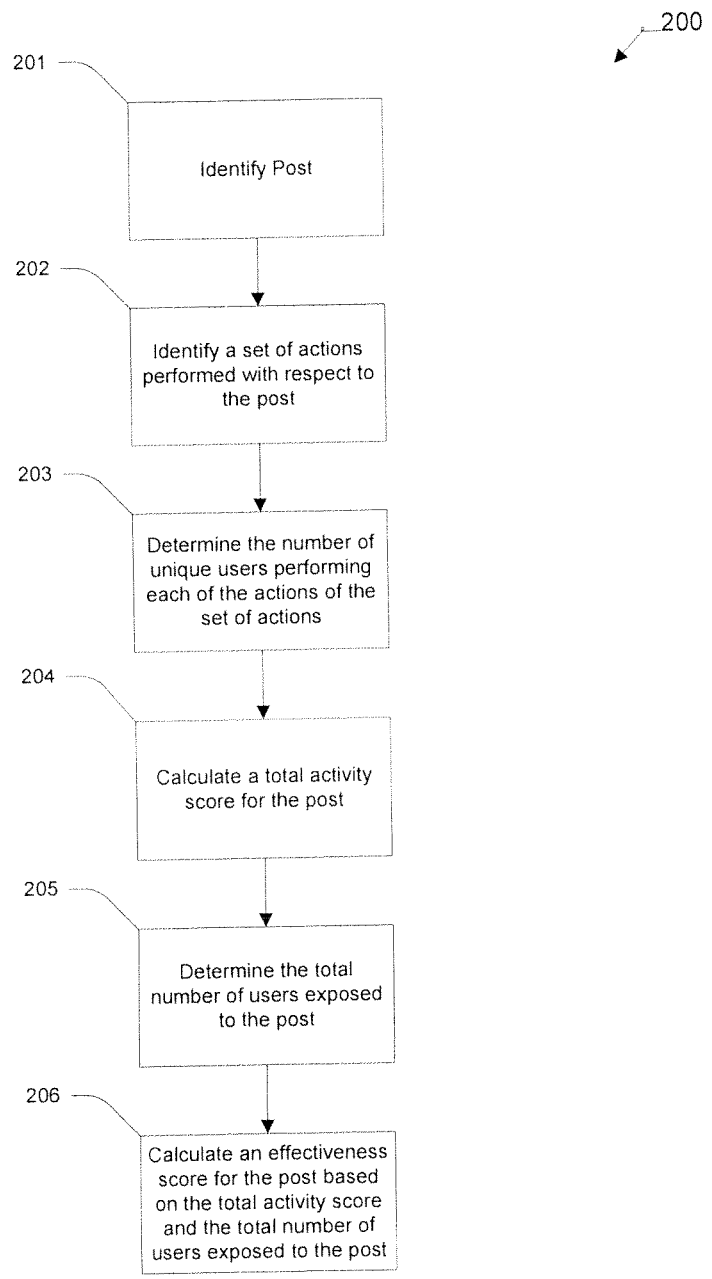
FIG. 2 illustrates a flow diagram of an example process for measuring the effectiveness of social networking activity.

FIG. 2 illustrates a flow diagram of an example process 200 for measuring the effectiveness of social networking activity. A post is used herein as an example of a social networking activity and may include, but is not limited to, a posting of any content by a profile owner at the social networking profile hosted at one or more social networking services. Same or similar processes may be performed with respect to social networking activity other than posts.

In step 201 the system identifies a post, for example, posted to a social networking profile by a profile owner. In one example, the post may include text, image, video, audio or other similar content that is posted to the profile. In one example, the post may include one or more links to other content.

In step 202, the system identifies one or more actions performed with respect to the post. Various actions may be considered including for example, sharing, commenting, endorsements, clicking an embedded link, or expanding a post. Additionally, actions which indicate the post was read such as scrolling, mouse hover, time in active window can also be considered.

The actions taken towards the posts include explicit actions (e.g., actions that are visible to the profile owner and/or other users), as well as implicit actions (e.g., actions not easily viewable). For example, explicit actions towards a post may include sharing the post, endorsements (e.g., +1s, likes or similar positive or negative endorsements of a post), and/or comments about the posts, which can be viewed by the profile owner, counted, and/or reported to the profile owner. Additionally, the effectiveness calculation takes into account implicit actions, which may not be easily viewable or reported to the user, including users choosing to follow a profile associated with a post (e.g., the owner of the post and/or content of the post) after having viewed the post, a user click through to the profile associated with the post, clicking on a link within the post, hovering over the post, expanding the post, scrolling through all comments associated with the post, starting a comment that is not actually posted, and/or taking other similar actions towards the post.

In step 203, the system determines the number of unique users performing each of the actions. In one example, for each action, the system calculates the total number of unique users performing that action. In step 204, the system calculates a total activity score for the post. For example, the system may add the total for each action for all of the identified actions (determined in step 202). In one example, the activity score is the total number of unique users performing an action (e.g., one or more actions) with respect to the post. In another example, the total activity score includes the total sum of all unique users that performed each action (e.g., if a user performs more than one action, the sum is incremented by the number of unique actions).

In step 205, the system determines a total number of unique users exposed to the post (e.g., users which viewed the post or were presented with the post as a result of the post appearing within their profile, wall, stream, newsfeed, etc., while the users were interacting with the social networking service). In step 206, the system calculates an effectiveness score for the post based on the calculated activity score and the total number of unique users who were exposed to the post. The effectiveness score is provided as a percentage and represents the percentage of users who after being exposed to the post, engaged with it in some manner. The effectiveness score may also be provided as a ratio (e.g., showing both the activity score and the total number of views) and/or a number (e.g., a decimal) showing the results of dividing the activity score and the total number of views (or unique views) of the post.

FIG. 3 illustrates an example graphical user interface 300 displaying the effectiveness score of one or more posts to an entity owner. A listing of one or more posts belonging to a profile owner is displayed. The posts selected may be selected by the user or the system. The displayed posts may be ranked by various criteria including recency, total post views, effectiveness score (interaction rate) or other ranking criteria. As illustrated, each post may include a post icon 301 showing the type of post, the post content 302, a post time stamp 303 displaying the time at which the posts was first generated and/or displayed on the profile of the profile owner, a total post views 304 and an interaction rate 305 corresponding to the effectiveness score of the post. The effectiveness score here is shown as a percentage. While the effectiveness score is displayed for each post individually, in one example, a total effectiveness score for all posts may additionally or alternatively be displayed.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
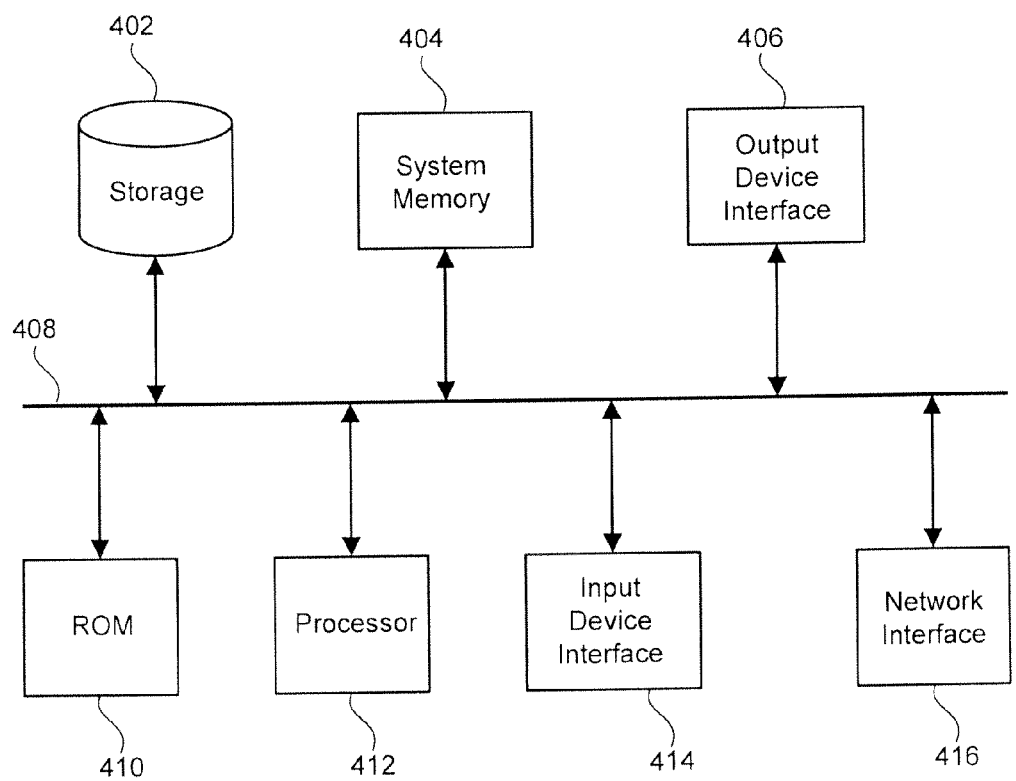
FIG. 4 conceptually illustrates an electronic system with which some implementations of the subject technology are implemented.

FIG. 4 conceptually illustrates an electronic system with which some implementations of the subject technology are implemented. Electronic system 400 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for measuring effectiveness of social networking activity. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. Features under one heading may be combined with features under one or more other heading and all features under one heading need not be use together. Features under one heading may be combined with features under one or more other heading and all features under one heading need not be use together.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for providing effectiveness indications for social networking activity, the method comprising:
   receiving a request to provide an effectiveness score associated with a social networking activity performed by in connection with a profile associated with a first user;
   identifying a plurality of actions performed with respect to the social networking activity by one or more other users exposed to the social networking activity, wherein the plurality of actions include explicit actions and implicit actions;
   for each of the plurality of actions, determining a total number of unique users performing said each action;

calculating an activity score for the social networking activity based on the determined total number of users performing said each of the plurality of actions, the activity score being calculated based at least in part on a sum of the number of unique users performing the one or more of the plurality of actions;

determining a number of users exposed to the social networking activity;

calculating the effectiveness score for the social networking activity based on the activity score and the number of users exposed to the social networking activity, the effectiveness score being calculated at least in part based on a ratio of the activity score to the number of users exposed to the social networking activity; and providing the effectiveness score for display in response to the request.

2. A computer-implemented method for providing effectiveness indications for social networking activity, the method comprising:

identifying a social networking activity performed in connection with a profile associated with a first user;

identifying a plurality of actions performed with respect to the social networking activity by one or more other users exposed to the social networking activity, wherein the plurality of actions include explicit actions and implicit actions;

for each of the plurality of actions, determining a total number of unique users performing the action; and calculating an activity score for the social networking activity based on the determined number of users performing each of the plurality of actions.

3. The method of claim 2, further comprising:
receiving a request to provide the activity score; and
providing the activity score for display, in response to the request.

4. The method of claim 2, wherein calculating the activity score comprises calculating the activity score based at least in part on a sum of the number of unique users performing one or more of the plurality of actions.

5. The method of claim 2, further comprising:
determining for each of the plurality of actions, a weight associated with the action; and
calculating the activity score based on the weight associated with each of the plurality of actions.

6. The method of claim 5, wherein the activity score comprises a weighted sum of the total number of unique users performing each of the plurality of actions based on the weight associated with each of the plurality of actions.

7. The method of claim 2, further comprising:
determining a number of users exposed to the social networking activity; and
calculating an effectiveness score for the social networking activity based on the activity score and the number of users exposed to the social networking activity.

8. The method of claim 7, further comprising:
receiving a request to provide an effectiveness score associated with the social networking activity; and
providing the effectiveness score for display in response to the request.

9. The method of claim 7, wherein calculating the effectiveness score comprises calculating the effectiveness score at least in part based on a ratio of the activity score to the number of users exposed to the to the social networking activity.

10. The method of claim 2, wherein the social networking activity comprises a post, the post comprising content posted to the profile associated with the first user.

11. The method of claim 2, wherein the explicit actions comprise actions that are viewable by the first user.

12. The method of claim 2, wherein the implicit actions comprise actions that are not viewable by a user.

13. A system for providing effectiveness indications for social networking activity, the system comprising:
one or more processors; and
a machine-readable medium comprising instructions stored therein, which when executed by the processors, cause the processors to perform operations comprising:
identifying a social networking activity performed in connection with a profile associated with a first user;
identifying a plurality of actions performed with respect to the social networking activity by one or more other users exposed to the social networking activity, wherein the plurality of actions include explicit actions and implicit actions;
for each of the plurality of actions, determining a total number of unique users performing said each action;
calculating an activity score for the social networking activity based on the determined total number of users performing said each of the plurality of actions;
determining a number of users exposed to the social networking activity; and
calculating an effectiveness score for the social networking activity based on the activity score and the number of users exposed to the social networking activity.

14. The system of claim 13, the operations further comprising:
receiving a request to provide an effectiveness score associated with the social networking activity; and
providing the effectiveness score for display, in response to the request.

15. The system of claim 13, wherein calculating the effectiveness score comprises calculating the effectiveness score at least in part based on a ratio of the activity score to the number of users exposed to the to the social networking activity.

16. The system of claim 13, wherein the explicit actions comprise actions that are viewable by the first user and wherein the implicit actions comprise actions that are not viewable by a user.

17. The system of claim 13, further comprising:
determining for each of the plurality of actions, a weight associated with the action; and
calculating the activity score based on the weight associated with each of the plurality of actions.

18. The system of claim 17, wherein the activity score comprises a weighted sum of the total number of unique users performing each of the plurality of actions based on the weight associated with each of the plurality of actions.

19. The system of claim 13, wherein calculating the activity score comprises calculating the activity score based at least in part on a sum of the number of unique users performing one or more of the plurality of actions.

20. The system of claim 13, wherein the social networking activity comprises a post, the post comprising content posted to the profile associated with the first user.

* * * * *